US012549874B2

(12) United States Patent
Wang et al.

(10) Patent No.: US 12,549,874 B2
(45) Date of Patent: Feb. 10, 2026

(54) PRIVATE LINE CONFIGURATION METHOD, OPTICAL NETWORK, DEVICE AND READABLE STORAGE MEDIUM

(71) Applicant: ZTE CORPORATION, Shenzhen (CN)

(72) Inventors: Dajiang Wang, Shenzhen (CN); Zhengqin Ming, Shenzhen (CN); Zhenyu Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 315 days.

(21) Appl. No.: 18/263,593

(22) PCT Filed: Dec. 10, 2021

(86) PCT No.: PCT/CN2021/137155
§ 371 (c)(1),
(2) Date: Jul. 31, 2023

(87) PCT Pub. No.: WO2022/193748
PCT Pub. Date: Sep. 22, 2022

(65) Prior Publication Data
US 2024/0089640 A1    Mar. 14, 2024

(30) Foreign Application Priority Data

Mar. 17, 2021 (CN) .......................... 202110284347.3

(51) Int. Cl.
*H04Q 11/00* (2006.01)
*H04B 10/27* (2013.01)
(Continued)

(52) U.S. Cl.
CPC ......... *H04Q 11/0062* (2013.01); *H04B 10/27* (2013.01); *H04L 41/0894* (2022.05);
(Continued)

(58) Field of Classification Search
None
See application file for complete search history.

(56) References Cited

U.S. PATENT DOCUMENTS 11,265,221 B2   3/2022  Bai et al.
2016/0241436 A1*  8/2016  Fourie .................. H04L 41/122
(Continued)

FOREIGN PATENT DOCUMENTS

CN    110198237 A    9/2019
CN    110868315 A    3/2020
(Continued)

OTHER PUBLICATIONS

International Searching Authority. International Search Report and Written Opinion for PCT Application No. PCT/CN2021/137155 and English translation, mailed Jan. 26, 2022, pp. 1-10.
(Continued)

*Primary Examiner* — Li Liu
(74) *Attorney, Agent, or Firm* — Vivacqua Crane, PLLC

(57) ABSTRACT

A private line configuration method, an optical network, a device and a readable storage medium are disclosed. The method may include, acquiring intention information of a private line, where the intention information comprises a demand for a resource allocation of the private line; determining an intention indicator and an element corresponding to the intention indicator according to the intention information, where the element is indicative of a rule to be followed in the resource allocation according to the intention indicator; determining an intention resource allocation strategy for the private line according to the intention indicator and the element; and allocating the private line with a private line network resource according to the intention resource allocation strategy.

11 Claims, 6 Drawing Sheets

(51) Int. Cl.
*H04L 41/0894* (2022.01)
*H04L 41/0896* (2022.01)

(52) U.S. Cl.
CPC .. *H04L 41/0896* (2013.01); *H04Q 2011/0086* (2013.01); *H04Q 2213/13541* (2013.01)

(56) References Cited

U.S. PATENT DOCUMENTS

| | | | | |
|---|---|---|---|---|
| 2021/0099352 A1* | 4/2021 | Bai | | H04L 41/5009 |
| 2021/0377111 A1* | 12/2021 | Xu | | H04L 41/5048 |
| 2022/0166683 A1* | 5/2022 | Shiner | | H04J 14/0284 |

FOREIGN PATENT DOCUMENTS

| | | | | | |
|---|---|---|---|---|---|
| CN | 111277442 A | * | 6/2020 | | H04L 1/0893 |
| CN | 111565114 A | | 8/2020 | | |
| WO | 2019237768 A1 | | 12/2019 | | |

OTHER PUBLICATIONS

Aklamanu, F., et al. "Intent-Based Real-Time 5G Cloud Service Provisioning" 2018 IEEE Globecom Workshops (GC WKSHPS), Dec. 2018, pp. 1-6.

European Patent Office. Extended European Search Report for EP Application No. 21931322.8, mailed Jan. 24, 2025, pp. 1-9.

* cited by examiner

PRIVATE LINE CONFIGURATION METHOD, OPTICAL NETWORK, DEVICE AND READABLE STORAGE MEDIUM

CROSS-REFERENCE TO RELATED APPLICATIONS

This application is a national stage filing under 35 U.S.C. § 371 of international application number PCT/CN2021/137155, filed Dec. 10, 2021, which claims priority to Chinese patent application 202110284347.3 filed Mar. 17, 2021. The contents of these applications are incorporated herein by reference in their entirety.

TECHNICAL FIELD

The present disclosure relates to the technical field of communication, in particular to a method for configuring private lines, an optical network, a device, and a readable storage medium.

BACKGROUND

With the advent of the era of digital transformation, network resource allocation is becoming more and more complex. The traditional network operation and management methods that manage the network through manual operations lack service agility, and fail to meet more complex and variable service demands. The network shall evolve from a static resource system to a dynamic resource system that can flexibly meet service demands. In terms of service private lines, very limited means are provided to achieve dynamic resource adjustment, although private lines have clear service demands. Apparently, it is inefficient to meet the service demands of private lines by managing the private lines through traditional network operation management methods.

SUMMARY

The following is a summary of the subject matter described herein. This summary is not intended to limit the scope of protection of the claims.

Provided are a method for configuring private lines, an optical network, a device, and a readable storage medium in some embodiments of the present disclosure.

An embodiment of the present disclosure provides a method for configuring private lines, which may include, acquiring intention information of a private line, where the intention information includes demand for a resource allocation of the private line; determining an intention indicator and an element corresponding to the intention indicator according to the intention information, where the element is indicative of a rule to be followed in the resource allocation according to the intention indicator; determining an intention resource allocation strategy for the private line according to the intention indicator and the element; and allocating the private line with a private line network resource according to the intention resource allocation strategy.

An embodiment of the present disclosure provides an optical network, which may include, an acquisition module configured to acquire intention information of a private line, where the intention information includes a demand for resource allocation of the private line; an intention translation module, which is configured to determine an intention indicator and an element corresponding to the intention indicator according to the intention information, where the element is indicative of a rule to be followed in the resource allocation according to the intention indicator; an intention arrangement module, which is configured to determine an intention resource allocation strategy for the private line according to the intention indicator and the element; and a private line configuration module, which is configured to allocate the private line with a private line network resource according to the intention resource allocation strategy.

An embodiment of the present disclosure further provides a device for configuring private lines, which may include at least one processor and a memory configured to communicate and connect with the at least one processor; where the memory stores an instruction that is executable by the at least one processor which, when executed by the at least one processor, causes the at least one processor to carry out the method as described above.

An embodiment of the present disclosure further provides a computer-readable storage medium storing thereon a computer-executable instruction which, when executed by a processor, causes the processor to carry out the method as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

DETAILED DESCRIPTION

The purpose, technical scheme and advantages of the present disclosure will become apparent through the following description for various embodiments in conjunction with the drawings. It should be understood that the embodiments described here are intended for illustration but not limitation to the present disclosure.

Provided are a method for configuring private lines, an optical network, a device, and a readable storage medium in some embodiments of the present disclosure. Based on the intention of resource configuration for a private line, an intention indicator is automatically analyzed and generated. Strategy arrangement is carried out according to the intention indicator, and the intention resource allocation strategy of the private line is generated. The private lines are allocated with resources that are managed according to the intention resource allocation strategy. Thereby, agile provisioning of optical network private lines is enabled, operation and maintenance (O&M) operations are simplified, and user experience is improved.

Some embodiments of the present disclosure will be further illustrated with reference to the drawings.

Figure 1:
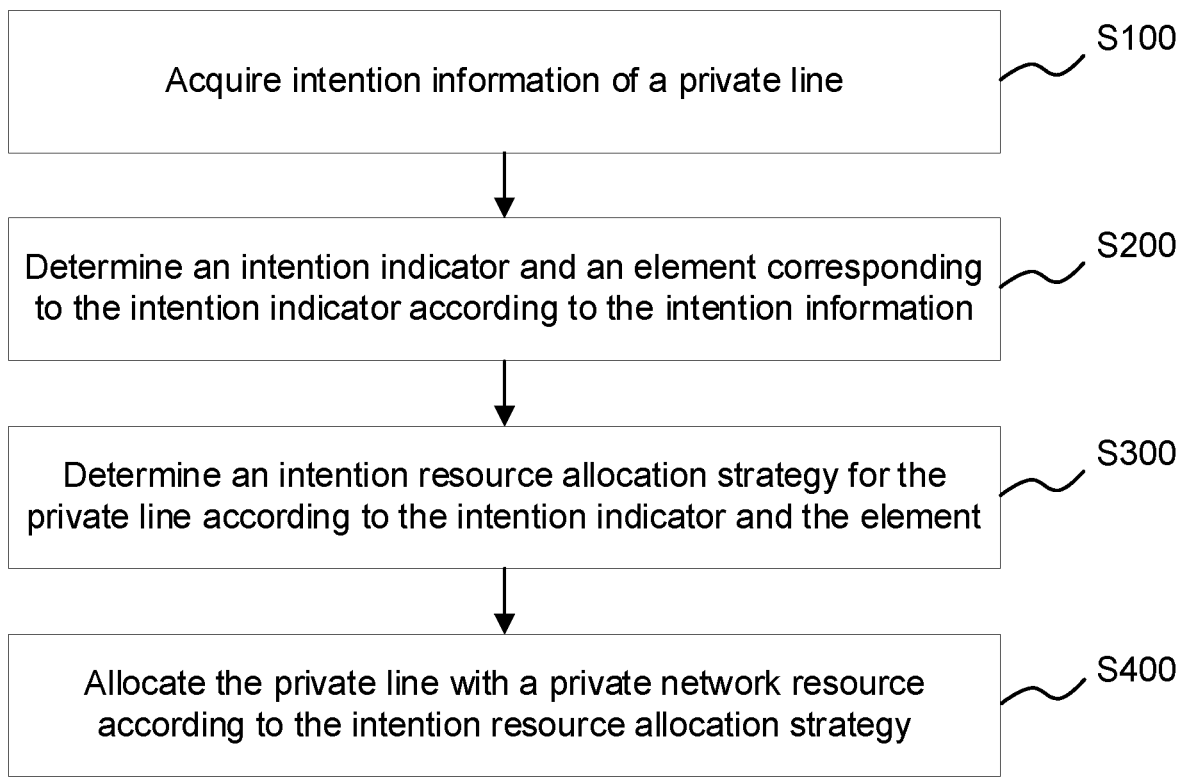
FIG. 1 depicts a flow chart showing a method for configuring private lines according to an embodiment of the present disclosure.

Referring to FIG. 1, an embodiment of the present disclosure provides a method for configuring private lines. The method includes but is not limited to the following operations S100, S200, S300, and S400.

At S100, intent information of a private line is acquired, the intention information includes demand for resource allocation of the private line.

With the advent of the era of digital transformation, the task of building a modern network is very important. However, due to the diversity of services and the complexity of the network, traditional network service managements become inefficient. In order to provide customers with a good experience, the network carrying services shall be transformed from a static resource system to a flexible dynamic resource system that meets service objectives. Although Software Defined Network (SDN) has a higher level of automation and flexibility than a traditional network, its operation method is basically unchanged. For example, SDN realizes the automation of network service arrangement, but the arrangement is limited to the decision and control of the use of IT infrastructure with the help of software applications, and still operates on a device-centric model, lacking the ability to perceive the network and respond promptly to users' network service demands. Therefore, in order to achieve the transformation for digitalization and service agility, transformation of the network into an intention-driven network integrating software, AI and digital twins shall be carried out instead of transforming the network into an SDN, so the intent-based networking (IBN) can come into being.

IBN is a brand-new networking model. Through AI, digital twins and other smart technologies, the model aims at agile perception, analysis and realization of user's network service strategy, that is, the "intention", and successively monitors whether these "intentions" are realized. Therefore, different from the traditional network operation management method, IBN operates on a network service-centered model, and realizes the network service intention required by users by automatically identifying and allocating network resources.

In order to comply with the trend of development of network digital transformation, under the background of the above changes brought by IBN, intention-based networks have become the direction of evolution of the development of smart optical transport network (OTN). To this end, the present disclosure creatively proposes the concept of Intent-Based Optical Network (IBON) architecture for providing a set of technical solutions for resource allocation in optical networks. In particular, according to the above S100, the intention information of a private line to be provisioned is collected. In the related technical scheme, relevant network parameters and transmission requirements of the private line to be provisioned are manually set. The network parameters and transmission requirements actually represent the resource constraints of the provisioning of the private line. For example, the network parameters and transmission requirements can be the source and destination nodes of the private line, the constrain of the path that the private line is intended to pass, the required time delay of the private line, the service scenarios of the private line, etc. The above basic information is input by users in the application layer of the IBON as the intention information, such that, intention analysis and strategy arrangement are carried out based on the above intention information, as will be discussed below.

It can be understood that, the input task of intention information of the users of the IBON should follow the principle of "input as less as possible". For intention information that is not provided by users, IBON can complete the intention information based on an intention completion mechanism (such as data collection of current network and machine learning application scenarios of AI). Therefore, the input of IBON in the application layer is different from the traditional private line configuration in that the private line can be automatically provisioned through the intention completion mechanism without the manual setting of each parameter. The provisioning and subsequent maintenance of the private line are thus simplified. The intention completion mechanism will be illustrated in the following embodiments.

At S200, an intention indicator and an element corresponding to the intention indicator are determined according to the intention information, where the element is indicative of a rule to be followed in resource allocation according to the intention indicator.

As can be seen from the above S100, the obtained intention information is actually expressed in natural language. In order to recognize the intention corresponding to the intention information within IBON, it is necessary to analyze the intention information to obtain the language for machine recognition. The intention information can be analyzed in various manners at S200, such as by information extraction, semantic analysis, speech recognition, or the like. The intention information can be converted into an intention indicator which is the quantitative information of the private line intention optimization indicator. In the present disclosure, the process of analyzing the intention information to obtain the intention indicator is called the process of intention generation logic. In this process, several elements are designed for the intention indicators according to the features of the intention indicators, so as to form structured data in IBON for the subsequent strategy arrangement. For example, a priority is generated for each intention indicator. The priority is utilized in the scene where two intentions conflict in the process of private line configuration. IBON prioritizes resource allocation for higher-priority private lines, so as to automatically solve the problems in the process of resource allocation. It can be understood that one intention indicator can correspond to a plurality of elements. These elements can be shared by all intention indicators, such as the priority discussed above. Alternatively, some intention indicators can be assigned with dedicated elements. The intention information is analyzed to form structured data for strategy arrangement in the IBON through S200.

At S300, an intention resource allocation strategy of the private line is determined according to the intention indicators and the elements.

The intention resource allocation strategy that meets the user's intention indicator is generated for the private line with different algorithms according to the intention generation logic. The generation involves performing optimization with some algorithm according to a preset network model which provides the algorithm with data for network resource scenarios (including routing, bandwidth margin, delay, routing constraints, network-wide load balancing rate and transmission distance, etc.) for optimization and calculation, so as to generate a scheme that can meet the users' demands for the private line to the greatest extent. It can be understood that different algorithms can be utilized to calculate the intention resource allocation strategy. The algorithms shall be applicable to the intention indicators and the elements corresponding to the intention indicators described at S200, such as an AI algorithm (neural network, reinforcement learning, or the like). The optimal result generated through the algorithm is the intention resource allocation strategy for the private line in discussion.

At S400, the private line is allocated with a private line network resource according to the intention resource allocation strategy.

The intention resource allocation strategy of the private line is applied to the current network. The private line is allocated with the private line network resources according to the intention resource allocation strategy by determining the practical situation of the resources of the current network. It can be understood that "allocating private line network resources" at this operation can be applied to the scenario of provisioning of private lines, and the scenario of adjustment of private line resources of the operating networks. The present disclosure is not limited to a particular scenario of the configuration of private line network resources. The method for configuring private lines in various embodiments of the present disclosure can be applied to any scenario as long as the service processing for private lines is involved. It can be understood that the process of configuring private line network resources can be carried out in the form of similar automation scripts, such as automatically collecting the current network resources, cross-configuring private lines along the route, etc., to ensure the efficiency and agility of the intention implementation.

In some scenarios, the intention-based method for configuring private lines in an embodiment of the present disclosure is suitable for the high-end private line or Virtual Private Network (VPN) private line of an OTN network. The so-called high-end private line (or VPN private line) refers to the dedicated service line provided by telecommunication operators, which has the advantages of high quality, high speed and low delay. Different from ordinary home telecommunication networks, high-end private line (or VPN private line) has its dedicated application scenarios and carries dedicated services. For example, international high-speed private lines can provide high-speed communication across countries. Therefore, the high-end private line (or VPN private line) involves apparent intention and requirements, such that the method for configuring private lines provided in various embodiments of the present disclosure is especially suitable for the high-end private lines. Through the method, the user's experience of the high-end private line (or VPN private line) is greatly improved.

Figure 2:
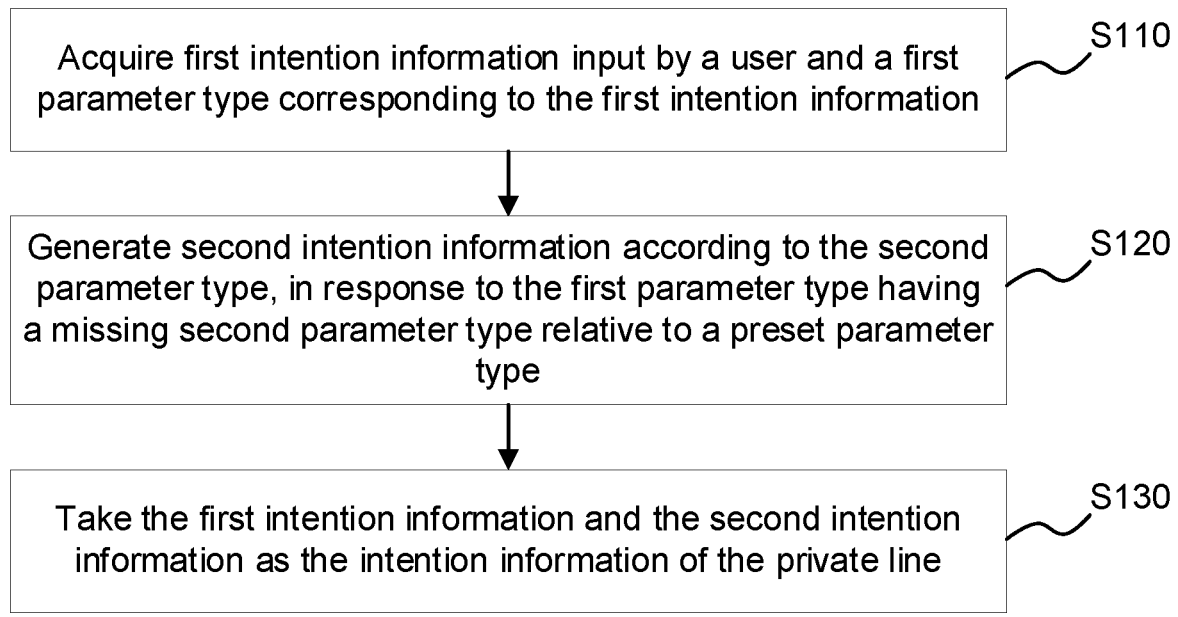
FIG. 2 depicts a flowchart showing a process for obtaining intention information according to an embodiment of the present disclosure.

Referring to FIG. 2, the collection of intention information based on the intention completion mechanism of an embodiment of the present disclosure can be carried out through the following operations.

At S110, first intention information input by a user and a first parameter type corresponding to the first intention information are acquired.

At S120, in response to the first parameter type having a missing second parameter type relative to a preset parameter type, second intention information is generated according to the second parameter type.

At S130, the first intention information and the second intention information are taken as the intention information of the private line.

Intention information is input by users at the application layer of the IBON. Since resource allocation involves various parameters, the intention information is generally a set of a plurality of intentions. Each intention information corresponds to its own parameter type. For example, if the parameters corresponding to the intention information about the source and destination nodes are node information of the source and destination nodes, the intention information input at the application layer corresponds to a plurality of parameter types. In this embodiment, these parameter types input at the application layer are collectively referred to as the first parameter type. Based on the principle of "input as less as possible", the intention information not provided by the user is completed by the intention completion mechanism. The intention completion mechanism acquires the first parameter type, compares the first parameter type with the preset parameter type, and identifies the parameter type contained in the preset parameter type that is missed from the first parameter type, i.e., the missing parameter type. In this embodiment, these missing parameter types are collectively referred to as the second parameter type. Then the second intention information is generated according to the second parameter type. It can be understood that the preset parameter type contains the necessary parameters for allocating the private line network resources for the private line. When the number of the first parameter types is less than the number of preset parameter types, the second intention information of the missing parameter type is automatically completed by data collection (such as the network topology, operator information, geographic location, etc. where OTN high-end private lines or VPN private lines are provisioned), AI learning combined with private line application scenarios (such as the routing cost, survivability, bandwidth margin, etc. of the OTN high-end private lines (or VPN private lines) required by financial-purposed private networks in a 50 node network topology scale), and other methods. For example, the first parameter type input at the application layer of the IBON lacks operator information, so the operator ownership of the port is automatically determined based on the various ports involved in the private line. The number and kinds of preset parameter types can be set manually. Alternatively, a set of initial parameter types can be provided manually, and then the remaining parameter types can be successively completed by machine learning.

Through the above intention completion mechanism, the set of the first intention information and the second intention information forms the intention information at S100 described above. The intention information is collected in the application layer of the IBON and input to the strategy arrangement and management layer of the IBON. It should be understood that the implementation of the intention completion mechanism is illustrated in this embodiment, but the implementation of the intention completion mechanism is not limited thereto.

Figure 3:
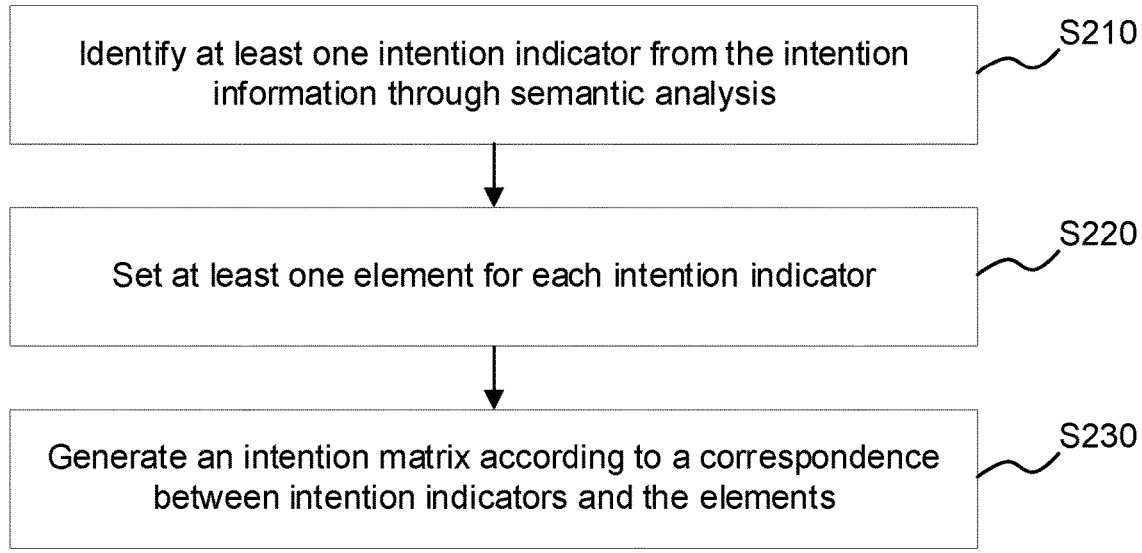
FIG. 3 depicts a flowchart showing a process for generating an intention matrix according to an embodiment of the present disclosure.

In the strategy arrangement and management layer of the IBON, the intention information of the private line is analyzed and the strategy arrangement is carried out through relevant technical schemes. Referring to FIG. 3, the intention information input at the application layer is analyzed through the following operations.

At S210, at least one intention indicator is identified from the intention information through semantic analysis.

At S220, at least one element is set for each intention indicator.

At S230, an intention matrix is generated according to a correspondence between intention indicators and the elements.

In this embodiment, the intention information expressed in natural language is transformed, and the quantitative information consistent with the intention information is obtained through semantic analysis. These pieces of quantitative information are called intention indicators in this embodiment, and corresponding elements are designed for these intention indicators, thus forming an intention matrix composed of structured data. For example, for each intention indicator, three elements are designed, i.e., optimization objective, priority and weight, where the optimization objective is indicative of the extent to which the intention indicator is optimized. In this embodiment, the optimization target is set to: maximization, minimization and being within a threshold range. For a better understanding, two intention indicators, delay and bit error rate, are illustrated by way of an example. The optimization objective of the delay can be set to minimization (meaning that the parameter of delay in the intention resource allocation strategy is optimized with the minimum value as the objective). The optimization objective of the error rate can be set to a threshold range (also called within a reasonable range, meaning that the value of the error rate in the intention resource allocation strategy can be optimized within a certain range). Priority is an important reference for balancing intentions when a conflict occurs in the optimization of several intention indicators, and it is the primary consideration in the intention strategy arrangement. Therefore, the primary objective of the priority-based intention strategy arrangement is the satisfaction of the intention indicator with the highest priority, and the optimization of intention indicators with lower priorities shall be also carried out with lower priority. Priority can be set for different intention indicators. The priority can be specified manually or automatically assigned through deep learning. For example, for private lines in financial-purposed private networks, deep learning automatically sets the highest priority for the intention indicator of time delay according to the real-time demand of private lines and users' feedback. The weight is intended to determine the weights of different intention indicators in intention strategy arrangement under the condition of multi-indicator optimization. It can be understood that the three elements discussed above are shared by all intention indicators of the private line. In practical application, more common elements may be set according to practical demands, or corresponding elements can be specially set for some intention indicators.

Figure 4:
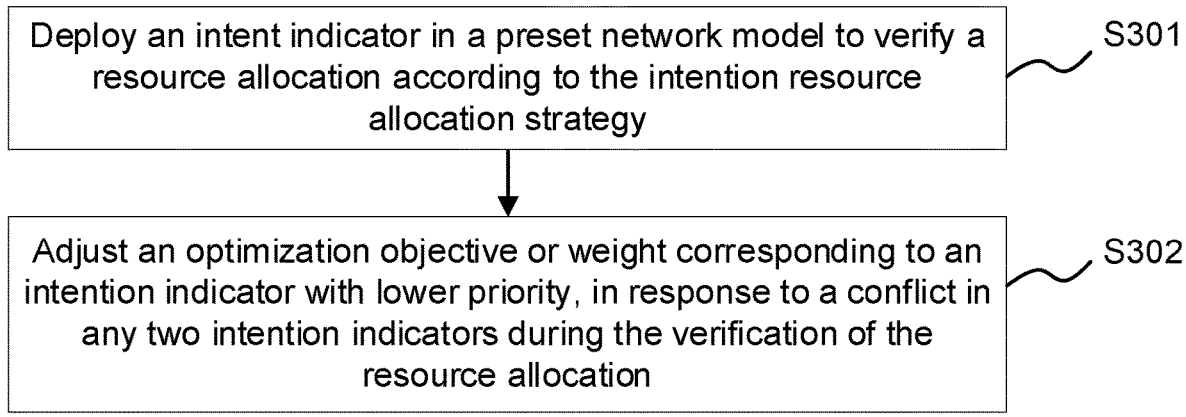
FIG. 4 depicts a flow chart showing a process of intention balancing processing according to an embodiment of the present disclosure.

The intention strategy arrangement is illustrated with the same example discussed above. The intention matrix is formed through the above operations S210 to S230, and the intention resource allocation strategy is generated through operation S300. Then the intention resource allocation strategy shall be verified before it is applied to the actual network. This verification is also carried out in the strategy arrangement and management layer of the IBON. Referring to FIG. 4, the verification includes the following operations.

At S301, an intention indicator is deployed in a preset network model to verify a resource allocation according to the intention resource allocation strategy.

At S302, an optimization objective or weight corresponding to an intention indicator with lower priority is adjusted, in response to a conflict in any two intention indicators during the verification of the resource allocation.

Since the generated intent resource allocation strategy is user-intention-oriented, the IBON does not care about the composition of the underlying network architecture, which results in uncertainty in the unverified intention resource allocation strategy in practical application. Therefore, it is necessary to deploy the intent resource allocation strategy in a preset network model for verification. During the verification, when a conflict occurs in the optimization of the intention indicators, adjustment is carried out according to the priorities. For example, if the cost of the selected path is too small, the bandwidth margin of the link that the path passes through fails to meet the optimization objective requirements of the intention indicator, "bandwidth margin". In such a case, the priority of the intention indicator "path cost" is lower than that of the intention indicator, "bandwidth margin", such that the minimum lower limit value of the optimization objective for the "path cost" is raised or the weight of the optimization for "path cost" is lowered. It can be understood that, the preset network model may be directly constructed manually, or may be automatically generated by data collection of the current network through the IBON. Alternatively, a general network model framework may be constructed by users in advance, and then successively improved by IBON in the subsequent operation process.

Figure 5:
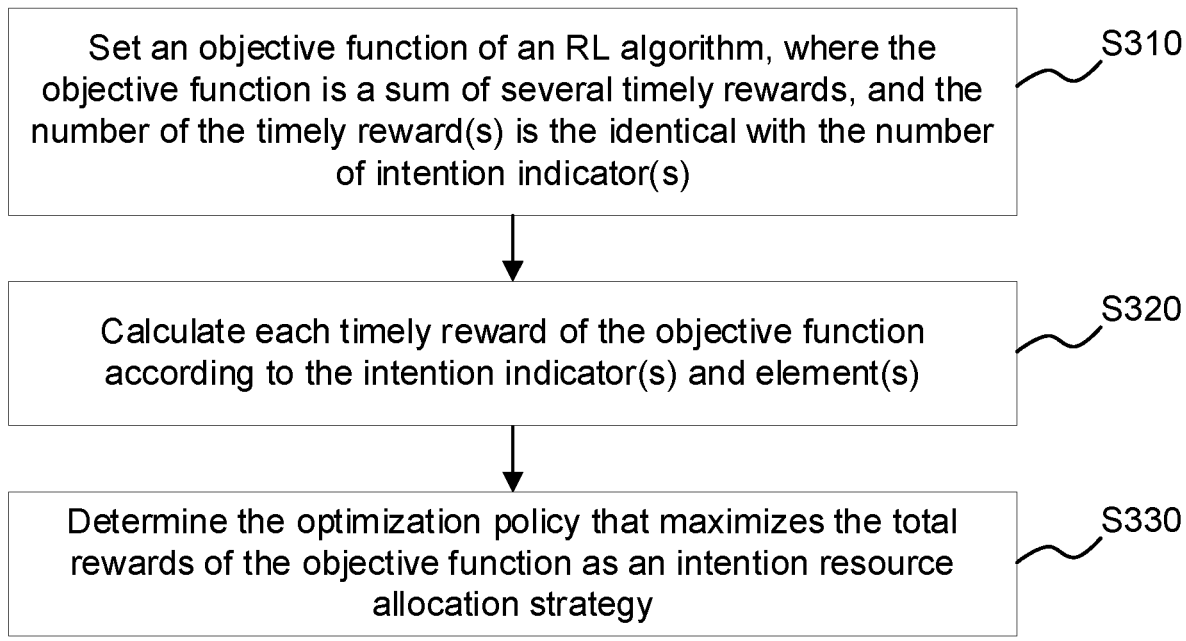
FIG. 5 depicts a flowchart showing a process for generating an intention resource allocation strategy by an RL algorithm according to an embodiment of the present disclosure.

In various embodiments of the present disclosure, the objective of intention strategy arrangement is to find out an algorithm for the comprehensive optimization of all intention indicators. And thus, how to realize the intention strategy arrangement, that is, how to generate the intention resource allocation strategy, is very important. In this embodiment, the intention resource allocation strategy is generated through Reinforcement Learning (RL) optimization. RL algorithm is one of the paradigms and methodologies of machine learning, which is intended to describe and solve the problem where agents learn strategies to maximize returns or achieve specific goals during their interaction with the environment. Referring to FIG. 5, the RL algorithm is carried out by the following operations.

At S310, an objective function of an RL algorithm is set, where the objective function is a sum of several timely rewards, and the number of the timely reward(s) is identical with the number of intention indicator(s).

At S320, each timely reward of the objective function is calculated according to the intention indicator(s) and element(s).

At S330, the optimization strategy that maximizes the total return of the objective function is determined as an intention resource allocation strategy.

It is necessary to define the parameters in the RL algorithm so as to apply the RL algorithm in the IBON. However, in fact, the RL algorithm contains many different specific algorithms, and it is not possible to exhaust them in the present disclosure. Therefore, examples of some algorithms are provided below to illustrate how to generate the intention resource allocation strategy through the RL algorithm.

Firstly, the objective function, and reward and punishment mechanism of RL algorithm are defined.

The final return function is set as:

$$G_{max} \leftarrow \max\left[\sum_{t=0}^{n} R_t\right].$$

The above equation indicates the optimal allocation of network resource attributes corresponding to all intention indicators. The allocation strategy is to maximize the return G obtained by the agent, and G is the total return obtained by the agent when an episode ends. In this embodiment, an episode is defined as the optimal allocation of resource attributes of intention indicators corresponding to the private line in turn by adopting a specified action strategy.

The above-mentioned n represents the number of intention indicators, t=1, 2, 3, . . . , n, $R_t$ is the value of the return of the $t^{th}$ intention indicator, i.e., the timely reward obtained by the agent carrying out action $a_{t-1}$ in state $s_{t-1}$. The higher the timely reward, the greater the value of $R_t$. In this embodiment, $R_0$=0 under the set state $s_0$, the value of $a_n$ in the state $s_n$ is null, and no processing is done, and $R_t$ can be expressed by that following function:

$$R_t = w_t P_t;$$

where $w_t$ is the weight of the $t^{th}$ intention indicator, $P_t$ is the actual reward obtained after the optimization of the $t^{th}$ intention indicator. The growth direction of the value of the actual reward is consistent with the optimization objective direction of the intention indicator, that is, the closer to the optimization objective, the greater the value of $P_t$.

Based on the above definition, different action strategies can be selected in the RL algorithm to optimize the intention resource allocation strategy.

In an embodiment, Q-Learning (i.e., temporal difference (TD) Error) is adopted to realize the intention strategy arrangement of the private line, and the optimization process is as follows.

The whole network topology environment is initialized, and the state behavior value is $Q(s,a) \leftarrow 0$ for all states $s \in S$ and $a \in A(s)$, where S is the set of states s, A(s) is the set of actions a in state s; the initial value of action strategy is random search strategy $\pi(s,a)$.

The state space (the set of states) S is initialized.

The following process is performed for each episode iteratively;

Action $a_t$ is selected in state $s_t$ according to the random search strategy $\pi(s,a)$;

Action $a_t$ is carried out, timely reward $R_{t+1}$ and the subsequent state $s_{t+1}$ are acquired;

Let $Q(s_t,a_t) \leftarrow Q(s_t,a_t) + \alpha[R_{t+1} + \gamma \max_a Q(s_{t+1},a_{t+1}) - Q(s_t,a_t)]$, where $\alpha$ is a learning rate and $\gamma$ is a discount factor;

Let $s_t \leftarrow s_{t+1}$ until the traversal of the state space S to which $s_t$ belong is completed;

Let the state behavior value Q(s,a) converge and the final strategy of the agent $\mu(s) \leftarrow \max_a Q(s,a)$ is output.

In another embodiment, SARSA (composed of state (S), action (A), reward (R), subsequent state (S') and subsequent action (A')), i.e., temporal difference (TD) error is adopted to realize the intention strategy arrangement of the private line. The optimization is carried out as follows.

The whole network topology environment is initialized, and the state behavior value is $Q(s,a) \leftarrow 0$ for all states $s \in S$ and $a \in A(s)$, where S is the set of states s, A(s) is the set of actions a in state s;

The state space (the set of states) S is initialized.

The initial state $s_0$ is given, and the action $a_0$ is selected according to the greedy strategy $\varepsilon$ (the action that gets the biggest timely reward is taken);

The following process is performed for each episode iteratively.

Action $a_t$ is selected in state $s_t$ according to the greedy strategy $\varepsilon$;

Action $a_t$ is carried out, and the timely reward $R_{t+1}$ and subsequent state $s_{t+1}$ are acquired.

Action $a_{t+1}$ is acquired according to the greedy strategy $\varepsilon$;

Let $Q(s_t,a_t) \leftarrow Q(s_t,a_t) + \alpha[R_{t+1} + \gamma Q(s_{t+1},a_{t+1}) - Q(s_t,a_t)]$, where $\alpha$ is a learning rate and $\gamma$ is a discount factor;

Let $s_t \leftarrow s_{t+1}$, and $a_t \leftarrow a_{t+1}$;

The process ends when the traversal of the state space S to which $s_t$ belong is completed;

Let the state behavior value Q(s,a) converge and the final strategy of the agent $\mu(s) \leftarrow \max_a Q(s,a)$ is output.

Through the introduction of the RL algorithm under the above two action strategies, it can be understood that, the intention resource allocation strategy can be automatically obtained by means of the RL algorithm through the intention matrix of the current private line. Under the overall private line configuration process, the user only needs to input a part of the intention of the private line, and the IBON can automatically optimize and obtain the intention resource allocation strategy of the private line based on the intention. The user does not have to consider the conflict between the resource optimization and allocation indicators during the resource allocation. The algorithm automatically configures the indicators that have been optimized for resource allocation and those that have not. Thereby, the O&M of the private line are simplified, the agile provisioning of the private line is achieved, and the user experience is improved.

An embodiment of the present disclosure will be illustrated by way of a practical example below.

The provisioning of OTN high-end private line or VPN private line based on intention generally contains four operations.

(1) Intention collection, which is to obtain the intention information of users of a telecommunication operator for provisioning of OTN high-end private line (or VPN private line). The first intention information input by users at the IBON application layer includes the source and destination nodes of OTN high-end private line (or VPN private line), application scenarios, strict routing constraints, delay requirements, etc., which are briefly shown in Table 1 below, but the first intention information is not limited thereto.

TABLE 1

Example of user's intention information for provisioning of OTN high-end private line (or VPN private line)

| First Intention Information (User Input) | Intention description | Attribute |
|---|---|---|
| Source/destination node | Source and destination node information of the OTN high-end private line (or VPN private line) | Required |
| Application scenario | Financial-purposed private network, enterprise private network, cross-domain information, etc. | Required |
| Strict routing constraints | The constraints in which a node that traffic of the OTN high-end private line (or VPN private line) must pass or avoid. | Required |
| Time delay | Expected time delay, for example, less than 5 ms | Optional |
| ... | ... | ... |

The above-described first intention information can be regarded as basic intention information. In order to ensure the simplicity principle of IBON, the principle of "input as less as possible" should be followed for the need for the information quantity of the first intention information from users, and the intention completion mechanism of IBON can be used for the second intention information that is not provided by users. The second intention information is automatically completed by data collection (such as the network topology, operator information, geographic location, etc. where the OTN high-end private lines or VPN private lines are provisioned), AI learning combined with private line application scenarios (such as the routing cost, survivability, bandwidth margin, etc. of the OTN high-end private lines (or VPN private lines) required by financial-purposed private networks in a 50 node network topology scale).

The first intention information and the second intention information are combined to obtain all intention information in the intention collection process.

(2) Intention Analysis

The IBON system semantically analyzes the collected intention information of OTN high-end private lines or VPN private lines, obtains the quantitative information of intention optimization indicators of all OTN high-end private lines (or VPN private lines) consistent with the user's intentions, and obtains intention indicators. The above process is called intention generation logic in the present disclosure, and intent analysis is the process of obtaining intention generation logic. In an embodiment of the present disclosure, three elements are designed for each intention indicator contained in the intention generation logic, i.e., the objective of indicator optimization, the priority of indicator optimization and the weight of indicator optimization.

The objective of indicator optimization corresponds to three kinds of values of the objective for indicator optimization, i.e., maximization, minimization and threshold interval.

The priority for indicator optimization is an important reference for trade-offs among the intentions when a conflict occurs in intention indicator optimization. The primary objective of the priority-based intention strategy arrangement is the satisfaction of the intention indicator with the highest priority, and the optimization of intention indicators with lower priorities shall be also carried out with lower priority.

The weight of indicator optimization is designed to deal with the case of multiple optimization indicators. Each indicator is assigned with its own intention optimization weight, and the "weight" of the indicator in the intention strategy arrangement is determined according to the weight.

Through intention generation logic, the intention indicator and the elements corresponding to the intention indicator can be obtained, and the intention matrix can be generated, so that structured data can be obtained in IBON system for subsequent intention strategy arrangement. For better understanding, an example of the intention matrix is shown in Table 2:

TABLE 2

Example of Intention Matrix Composed of Multi-Intention Indicators with three elements

| Intention indicator | optimization objective | priority | weight |
|---|---|---|---|
| Time delay (ms) | Minimization | 5 | 0.3 |
| Bandwidth and Margin (Gbit/s) | Threshold interval | 2 | 0.1 |
| cost | Minimization | 3 | 0.2 |
| Bit error rate (%) | Threshold interval | 4 | 0.2 |
| Survivability | Threshold interval | 3 | 0.1 |
| Constraint satisfied (%) | Maximization | 2 | 0.1 |
| ... | ... | ... | ... |

(3) Arrangement and Generation of Intention Strategy

According to the intention generation logic, AI algorithm is applied to network resources allocation (including routing, bandwidth, delay, bandwidth margin, routing constraints, load balance rate of the whole network, survivability protection, transmission distance, cost and so on) that meet the user's intention indicators for OTN high-end private line or VPN private line. The result of resource allocation obtained after the operation of the algorithm is the network resource intention arrangement strategy for the OTN high-end private line (or VPN private line).

In this operation, the RL algorithm can be utilized to carry out the strategy arrangement and generation. That is, the intention indicator matrix contained in the intention generation logic can be utilized to carry out the comprehensive optimization of all intention indicators through the RL algorithm as the objective of the arrangement and generation of intention strategy.

The objective function, and reward and punishment mechanism of the RL algorithm for comprehensive optimization of all intention indicators are defined as follows.

The final return function is set as:

$$G_{max} \leftarrow \max\left[\sum_{t=0}^{n} R_t\right];$$

The above equation indicates the optimal allocation of the corresponding network resource attributes for all intention indicators. The allocation strategy is to maximize the return G obtained by the agent, and G is the total return obtained by the agent when an episode ends. In this embodiment, an episode is defined as the optimal allocation of resource attributes of intention indicators corresponding to the private line in turn by adopting a specified action strategy.

The above-mentioned n represents the number of intention indicators, t=1, 2, 3, . . . , n, $R_t$ is the value of the reward of the $t^{th}$ intention indicator, i.e., the timely reward obtained by the agent carrying out the action $a_{t-1}$ in state $s_{t-1}$. The higher the timely reward, the greater the value of $R_t$. In this embodiment, $R_0$=0 under the set state $s_0$, the value of $a_n$ in the state $s_n$ is null so that no processing is done, and $R_t$ can be expressed by that following function:

$$R_t = w_t P_t;$$

where $w_t$ is the weight of the $t^{th}$ intention indicator, $P_t$ is the actual reward obtained after the optimization of the $t^{th}$ intention indicator. The growth direction of the value of the actual reward is consistent with the optimization objective direction of the intention indicator, that is, the closer to the optimization objective, the greater the value of $P_t$.

Based on the above definition, different action strategies can be selected in RL algorithm to optimize the intention resource allocation strategy. For example, the action strategy is determined by the random search strategy in the Q-Learning algorithm or the greedy strategy in the SARSA algorithm, so as to automatically calculate the intention resource allocation strategy for configuring the private line in an embodiment of the present disclosure.

Figure 6:
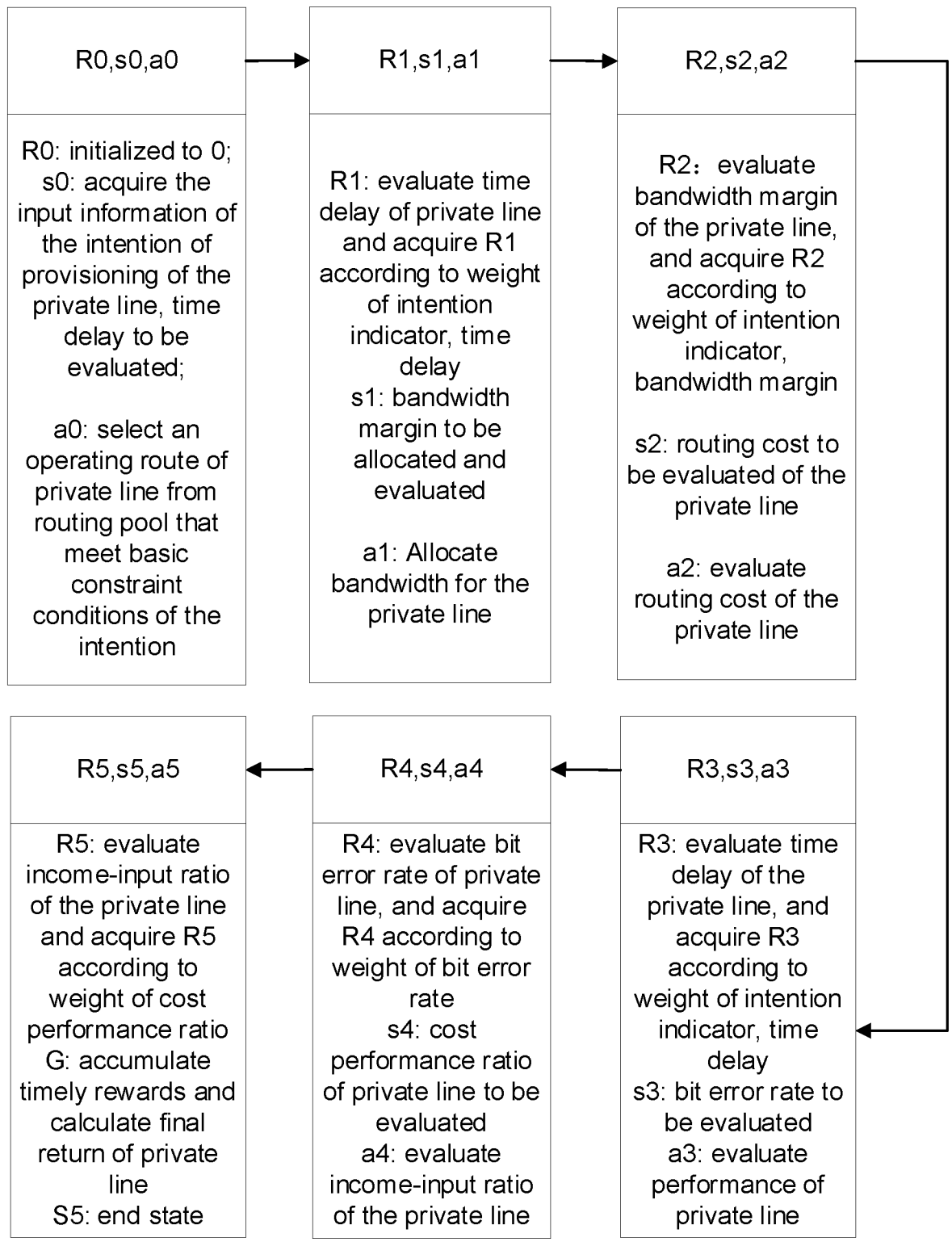
FIG. 6 depicts a flowchart showing an algorithm processing in the process of intention strategy arrangement and generation according to an embodiment of the present disclosure.

Referring to FIG. 6, a brief flow of an algorithm is provided to illustrate the above intention strategy arrangement and generation.

The settings are as follows: timely reward is set as $R_t$, current state is set as $s_t$, current action is set as $a_t$, and the final return is set as G. The intention indicators include, time delay, bandwidth margin, routing cost, bit error rate and cost performance ratio of the private line.

$R_0$=0 is set in the initial state $s_0$, the state $s_0$ is to obtain the input information of the intention of provisioning of the private line, the time delay to be evaluated, and the action to be performed $a_0$ is to select the operating route of the private line from the routing pool that meet the basic constraint conditions of the intention.

The time delay of the private line is evaluated according to the previous action, and timely reward $R_1$ is acquired according to the weight of the intention indicator, time delay. At this time, state $s_1$ relates to the bandwidth margin to be allocated and evaluated, and the action to be performed $a_1$ is to allocate bandwidth for the private line.

The bandwidth margin of the private line is evaluated according to the previous action, and timely reward $R_2$ is acquired according to the weight of the intention indicator, bandwidth margin. At this time, state $s_2$ relates to the routing cost to be evaluated of the private line, and the action to be performed $a_2$ is to evaluate the routing cost of the private line.

The routing cost of the private line is evaluated according to the previous action, and timely reward $R_3$ is acquired according to the weight of the intention indicator, routing cost. At this time, state $s_3$ relates to the bit error rate to be evaluated of the private line, and the action to be performed $a_3$ is to evaluate the bit error rate of the private line.

The bit error rate of the private line is evaluated according to the previous action, and timely reward $R_4$ is acquired according to the weight of the intention indicator, bit error rate. At this time, state $s_4$ relates to the cost performance ratio to be evaluated of the private line (the ratio of income to input), and the action to be performed $a_4$ is to evaluate the income-input ratio of the private line.

The cost performance ratio of the private line is evaluated according to the previous action, and timely reward $R_5$ is acquired according to the weight of the intention indicator, cost-performance ratio. Since the calculation for the last intention indicator has been completed in this operation, the timely rewards are accumulated, such that the final return G of the private line is calculated, and state $s_5$ is set to the termination state, the current episode is ended.

Through the above method, when the intention resource allocation strategy is obtained, the strategy can be verified by configuring the same into a preset network model. Then it is checked whether conflicts occur in the optimization of multiple intention indicators. When conflicts occur in the optimization of intention indicators, intention trade-off processing is carried out as follows. The elements of intention indicators in the intention matrix are adjusted. In an example, the cost of the selected path is too small to enable the bandwidth margin of the link that the path passes through to meet the optimization objective and requirements of the intention indicator "bandwidth margin". In such a case, if the priority of the intention indicator, "path cost" is lower than that of the intention indicator "bandwidth margin", then the minimum lower limit value of the optimization objective of "path cost" is raised or the weight for optimization of "path cost" is lowered. After such an adjustment, the intention strategy is rearranged according to the new intention matrix, and a new intention resource allocation strategy is generated and again verified.

Figure 7:
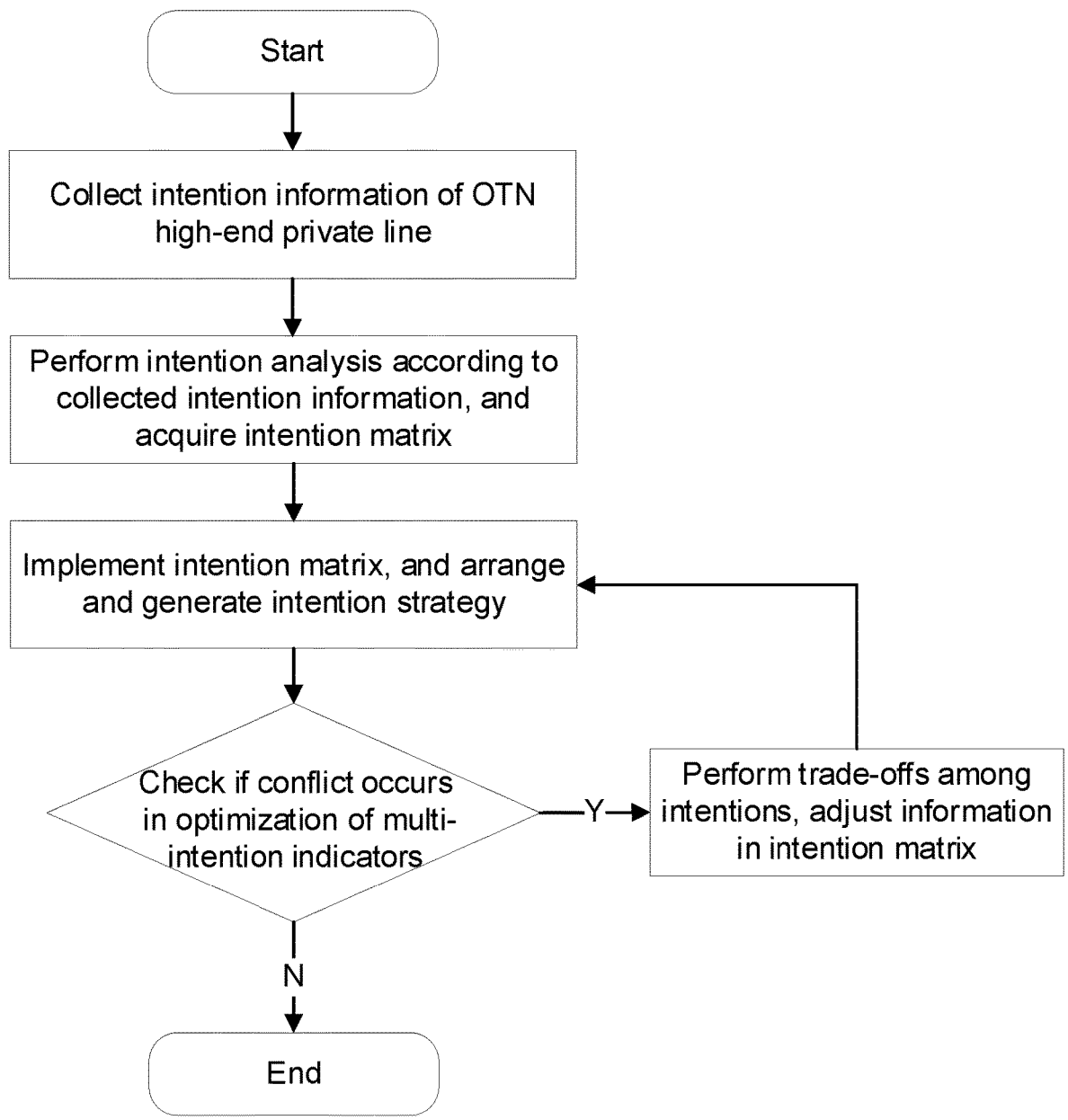
FIG. 7 depicts a flow chart showing the first three main operations according to an embodiment of the present disclosure.

The above three main operations are shown in FIG. 7. As shown in FIG. 7, by collecting the intention information of the OTN high-end private line and analyzing the intention according to the collected intention information, an intention matrix including multiple intention indicators such as time delay, bandwidth margin and path cost is generated, and then the intention strategy is arranged and generated according to the intention matrix. When the intention resource allocation strategy is generated, the strategy is verified. If a conflict occurs in the optimization of the multi-intention indicators, a trade-off among the intentions is carried out, and then re-arrangement and verification of the intention strategy are carried out until no conflict occurs in the optimization of the multi-intention indicators.

(4) Intention Implementation and Realization

The intention resource allocation strategy obtained from the above operations is applied to the practical network for configuring the private line. In practice, the private line service is automatically created according to the intention strategy. The subsequent operations for the intention strategy are designed in a way similar to automation scripts. The operations have a task to determine parallel operations and serial operations for the execution of the strategy to ensure the efficiency and agility of intention execution and the agile provisioning of service. Cross configuration of private lines along the route is an example.

An embodiment of the present disclosure further provides an optical network, which includes the following modules.

An acquisition module, which is configured to acquire intention information of a private line, where the intention information includes a demand for a resource allocation of the private line.

An intention translation module, which is configured to determine an intention indicator and an element corresponding to the intention indicator according to the intention information, where the element is indicative of a rule to be followed in the resource allocation according to the intention indicator.

An intention arrangement module, which is configured to determine an intention resource allocation strategy of the private line according to the intention indicator and the element.

A private line configuration module, which is configured to allocate the private line with a private line network resource according to the intention resource allocation strategy.

The above-mentioned optical network can be considered as a network including modules for carrying out the above-described method for configuring private lines, or as a network including an IBON system that includes modules for carrying out the above-described method. According to the optical network according to an embodiment of the present disclosure, by analyzing the intention information of the private line, the intention indicators of the private line and the elements corresponding to the intention indicators are determined, so that the direction and rules for resource allocation of the private line are defined. Then the intention resource allocation strategy for the private line is arranged and generated based on the intention indicator and elements of the private line. In an embodiment of the present disclosure, line configuration is carried out based on the intention-based intention resource allocation strategy, which achieves agile provisioning and simplified O&M of the private lines. By automatically identifying and allocating network resources, the flexible and dynamic service objectives during provisioning and maintenance of private lines are met, thus improving the user's experience for private lines.

An embodiment of the present disclosure further provides a device for configuring private lines, which includes at least one processor and a memory configured to communicate and connect with the at least one processor. The memory stores an instruction that is executable by the at least one processor which, when executed by the at least one processor, causes the at least one processor to carry out the method as described above.

Figure 8:
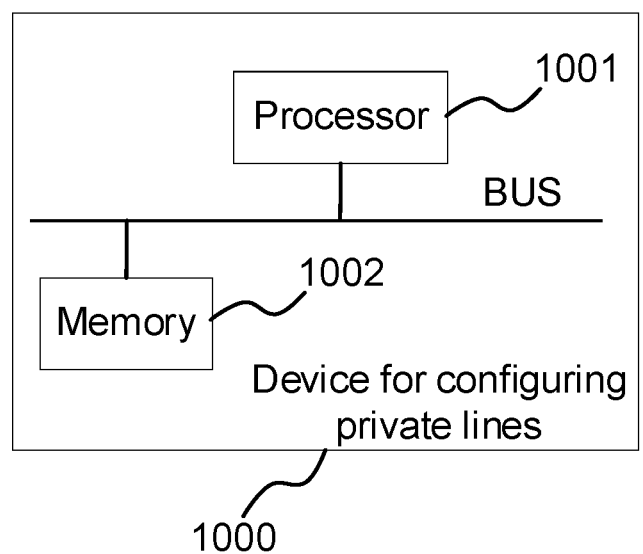
FIG. 8 depicts a schematic diagram showing a device for configuring private lines according to an embodiment of the present disclosure.

Referring to FIG. 8, the control processor 1001 and the memory 1002 in the device for configuring private lines 1000 can be connected for example, through a bus. As a non-transitory computer-readable storage medium, memory 1002 can be configured to store non-transitory software programs and non-transitory computer-executable programs. In addition, memory 1002 can include high-speed random-access memory and non-transitory memory, such as at least one disk memory device, flash memory device, or other non-transitory solid-state memory devices. In some implementations, memory 1002 can include memories remotely located relative to control processor 1001, and these remote memories may be connected to the device for configuring private lines 1000 through a network. Examples of the above networks include, but are not limited to, the Internet, intranet, local area network, mobile communication network, and combinations thereof.

It can be understood by those having ordinary skills in the art that the device shown in FIG. 8 does not constitute a limitation to the device for configuring private lines 1000 which may include more or less components than those shown, or some components may be combined, or have different component arrangements.

An embodiment of the present disclosure further provides a computer-readable storage medium, which stores computer-executable instructions which, when executed by at least one control processor, e.g., the control processor 1001 shown in FIG. 8, causes the at least one control processor to carry out the operations of the method described above, for example, the above-described operations S100 to S400 described in conjunction with FIG. 1, S110 to S130 described in conjunction with FIG. 2, S210 to S230 described in conjunction with FIG. 3, S301 to S302 described in conjunction with FIG. 4, S310 to S330 described in conjunction with FIG. 5.

The method for configuring private lines according to various embodiments of the present disclosure has at least the following beneficial effects. By analyzing the intention information of the private line, the intention indicators of the private line and the elements corresponding to the intention indicators are determined, so that the direction and rules for resource allocation of the private line are defined. Then the intention resource allocation strategy for the private line is arranged and generated based on the intention indicator and elements of the private line. In an embodiment of the present disclosure, line configuration is carried out based on the intention-based intention resource allocation strategy, which achieves agile provisioning and simplified O&M of the private lines. By automatically identifying and allocating network resources, the flexible and dynamic service objectives during provisioning and maintenance of private lines are met, thus improving the user's experience with private lines.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description for some embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for configuring private lines, comprising,
  acquiring intention information input by a user of a private line, wherein the intention information comprises a demand for a resource allocation of the private line;
  determining a plurality of intention indicators that are machine recognizable and a plurality of elements corresponding to the plurality of intention indicators according to the intention information, wherein each of the plurality of elements is indicative of a rule to be followed in the resource allocation according to at least one of the plurality of intention indicators, wherein, each of the plurality of elements comprises optimization objective, priority and weight, and the optimization objective is directed to one of maximizing the at least one of the plurality of intention indicators, minimizing the at least one of the plurality of intention indicators, or falling the at least one of the plurality of intention indicators within a threshold interval;
  inputting the plurality of intention indicators and the plurality of elements into a reinforcement learning (RL) algorithm to acquire an intention resource allocation strategy for the private line;
  deploying the plurality of intention indicators in a preset network model to perform a verification of a resource allocation according to the intention resource allocation strategy;
  in response to a conflict of two intention indicators of the plurality of intention indicators, during the verification of the resource allocation, adjusting the optimization objective or a weight corresponding to an intention indicator having a lower priority in the two intention indicators; and
allocating the private line with a private line network resource according to the intention resource allocation strategy in order to provision the private line in an optical transport network (OTN).

2. The method of claim 1, wherein, acquiring the intention information of the private line comprises,
  acquiring first intention information input by the user and a first parameter type corresponding to the first intention information;
  in response to the first parameter type having a second parameter type that is missed relative to a preset parameter type, generating second intention information according to the second parameter type;
  taking the first intention information and the second intention information as the intention information of the private line; and
  the plurality of intention indicators at least comprise at least two of time delay, bandwidth and margin, cost, Bit Error Rate (BER), and Survivability.

3. The method of claim 1, wherein, determining the plurality of intention indicators and the plurality of elements corresponding to the plurality of intention indicators according to the intention information comprises,
  determining the plurality of intention indicators from the intention information through semantic analysis;
  setting the plurality of elements for the plurality of intention indicators; and
  generating an intention matrix according to a correspondence between the plurality of intention indicators and the plurality of elements.

4. The method of claim 1, wherein, inputting the plurality of intention indicators and the plurality of elements into the RL algorithm to acquire the intention resource allocation strategy comprises,
  setting an objective function for the RL algorithm, wherein the objective function is a sum of a plurality of timely rewards, and a quantity of the timely rewards is identical with a quantity of the intention indicators;
  calculating each timely reward of the objective function according to the plurality of intention indicators and plurality of elements; and
  determining an optimization strategy that maximizes a total reward of the objective function as the intention resource allocation strategy.

5. The method of claim 4, wherein, setting the objective function for the RL algorithm comprises,
  setting a random search strategy as an action strategy, and updating an action value selected for each cycle of the objective function according to the random search strategy; or,
  setting a greedy strategy as an action strategy, and updating the action value selected for each cycle of the objective function according to the greedy strategy;
  wherein the method further comprises:
  setting a final return function as:

$$G_{max} \leftarrow \max\left[\sum_{t=0}^{n} R_t\right];$$

wherein, n represents the number of intention indicators, t=1, 2, 3, . . . , n, $R_t$ is value of reward of $t^{th}$ intention indicator, and is expressed as $R_t=w_t P_t$, wherein $w_t$ is the weight of the $t^{th}$ intention indicator, $P_t$ is an actual reward obtained after an optimization of the $t^{th}$ intention indicator is done;
  wherein the final return function indicates the optimal allocation of the corresponding network resource attributes for all intention indicators, the allocation strategy is to maximize a return G obtained by an agent, and G is the total return obtained by the agent when an episode ends, and an episode is defined as an optimal allocation of resource attributes of the plurality of intention indicators corresponding to the private line in turn by adopting a specified action strategy; and
  wherein the plurality of intention indicators comprises time delay, bandwidth margin, routing cost, bit error rate and cost performance ratio of the private line.

6. A device for configuring private lines, comprising at least one processor and a memory configured to communicate and connect with the at least one processor;
  wherein the memory stores an instruction executable by the at least one processor which, when executed by the at least one processor, causes the at least one processor to carry out a method for configuring private lines, comprising, acquiring intention information input by a user of a private line, wherein the intention information comprises a demand for a resource allocation of the private line;

determining a plurality of intention indicators that are machine recognizable and a plurality of elements corresponding to the plurality of intention indicators according to the intention information, wherein each of the plurality of elements is indicative of a rule to be followed in the resource allocation according to at least one of the plurality of intention indicators, wherein, the plurality of elements comprises optimization objective, priority and weight, and the optimization objective is directed to one of maximizing the at least one of the plurality of intention indicators, minimizing the at least one of the plurality of intention indicators, or falling the at least one of the plurality of intention indicators within a threshold interval;

inputting the plurality of intention indicators and the plurality of elements into a reinforcement learning (RL) algorithm to acquire an intention resource allocation strategy for the private line; and deploying the plurality of intention indicators in a preset network model to perform a verification of a resource allocation according to the intention resource allocation strategy;

in response to a conflict of two intention indicators of the plurality of intention indicators, during the verification of the resource allocation, adjusting the optimization objective or a weight corresponding to an intention indicator having a lower priority in the two intention indicators; and allocating the private line with a private line network resource according to the intention resource allocation strategy, in order to provision the private line in an optical transport network (OTN).

7. The device of claim 6, wherein, acquiring intention information of the private line comprises, acquiring first intention information input by the user and a first parameter type corresponding to the first intention information;

in response to the first parameter type having a second parameter type that is missed relative to a preset parameter type, generating second intention information according to the second parameter type; and taking the first intention information and the second intention information as the intention information of the private line.

8. The device of claim 6, wherein, determining the plurality of intention indicators and the plurality of elements corresponding to the plurality of intention indicators according to the intention information comprises, determining at least one intention indicator from the intention information through semantic analysis;

setting the plurality of elements for the plurality of intention indicators; and generating an intention matrix according to a correspondence between the plurality of intention indicators and the plurality of elements.

9. A non-transitory computer-readable storage medium storing a computer-executable instruction which, when executed by a processor, causes the processor to carry out a method for configuring private lines, comprising, acquiring intention information input by a user of a private line, wherein the intention information comprises a demand for a resource allocation of the private line;

determining a plurality of intention indicators that are machine recognizable and a plurality of elements corresponding to the plurality of intention indicators according to the intention information, wherein each of the plurality of elements is indicative of a rule to be followed in the resource allocation according to at least one of the plurality of intention indicators, wherein, the plurality of elements comprises optimization objective, priority and weight, and the optimization objective is directed to one of maximizing the at least one of the plurality of intention indicators, minimizing the at least one of the plurality of intention indicators, or falling the at least one of the plurality of intention indicators within a threshold interval;

inputting the plurality of intention indicators and the plurality of elements into a reinforcement learning (RL) algorithm to acquire an intention resource allocation strategy for the private line; and deploying the plurality of intention indicators in a preset network model to perform a verification of a resource allocation according to the intention resource allocation strategy;

in response to a conflict of two intention indicators of the plurality of intention indicators, during the verification of the resource allocation, adjusting the optimization objective or a weight corresponding to an intention indicator having a lower priority in the two intention indicators; and allocating the private line with a private line network resource according to the intention resource allocation strategy, in order to provision the private line in an optical transport network (OTN).

10. The non-transitory computer-readable storage medium of claim 9, wherein, acquiring intention information of the private line comprises, acquiring first intention information input by the user and a first parameter type corresponding to the first intention information;

in response to the first parameter type having a second parameter type that is missed relative to a preset parameter type, generating second intention information according to the second parameter type; and taking the first intention information and the second intention information as the intention information of the private line.

11. The non-transitory computer-readable storage medium of claim 9, wherein, determining the plurality of intention indicators and the plurality of elements corresponding to the intention indicator according to the intention information comprises, determining the plurality of intention indicators from the intention information through semantic analysis;

setting the plurality of elements for the plurality of intention indicators; and generating an intention matrix according to a correspondence between the plurality of intention indicators and the plurality of elements.

* * * * *